(12) United States Patent
Rhoads et al.

(10) Patent No.: US 10,870,234 B2
(45) Date of Patent: Dec. 22, 2020

(54) METHODS AND APPARATUS FOR 3D PRINTING OF HIGHLY VISCOUS MATERIALS

(71) Applicant: Purdue Research Foundation, West Lafayette, IN (US)

(72) Inventors: Jeffrey Frederick Rhoads, West Lafayette, IN (US); Ibrahim Emre Gunduz, West Lafayette, IN (US); Steven Forrest Son, West Lafayette, IN (US); George Tsu-Chih Chiu, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 283 days.

(21) Appl. No.: 15/769,764

(22) PCT Filed: Nov. 7, 2017

(86) PCT No.: PCT/US2017/060346
§ 371 (c)(1),
(2) Date: Apr. 20, 2018

(87) PCT Pub. No.: WO2018/089341
PCT Pub. Date: May 17, 2018

(65) Prior Publication Data
US 2019/0283319 A1    Sep. 19, 2019

Related U.S. Application Data

(60) Provisional application No. 62/418,874, filed on Nov. 8, 2016.

(51) Int. Cl.
*B29C 64/209* (2017.01)
*B33Y 10/00* (2015.01)
(Continued)

(52) U.S. Cl.
CPC ............ *B29C 64/209* (2017.08); *B05B 17/06* (2013.01); *B29C 64/118* (2017.08); *B33Y 10/00* (2014.12);
(Continued)

(58) Field of Classification Search
CPC ..... B29C 64/209; B29C 64/118; B33Y 10/00; B33Y 30/00; B33Y 70/00; B05B 17/06; B29K 2103/08
(Continued)

(56) References Cited

U.S. PATENT DOCUMENTS

| 5,653,925 A | * | 8/1997 | Batchelder | ............ B29C 64/112 264/113 |
| 6,450,393 B1 | | 9/2002 | Doumanidis et al. | |

(Continued)

OTHER PUBLICATIONS

International Search Report and Written Opinion for PCT/US2017/060346, dated Jan. 4, 2018, 8 pages.

*Primary Examiner* — Matthew J Daniels
*Assistant Examiner* — Gregory Chad Grosso
(74) *Attorney, Agent, or Firm* — Purdue Research Foundation; Zhigang Rao

(57) ABSTRACT

This disclosure generally relates to methods and apparatus for 3D printing of highly viscous materials, especially to high amplitude ultrasonic vibration facilitated lower temperature 3D printing of highly viscous materials with a viscosity of at least 1000 Pa·s.

9 Claims, 3 Drawing Sheets

(51) Int. Cl.
    *B33Y 30/00*           (2015.01)
    *B29C 64/118*        (2017.01)
    *B05B 17/06*          (2006.01)
    *B33Y 70/00*          (2020.01)
    *B29K 103/08*        (2006.01)

(52) U.S. Cl.
    CPC .......... *B33Y 30/00* (2014.12); *B29K 2103/08* (2013.01); *B33Y 70/00* (2014.12)

(58) Field of Classification Search
    USPC ........................................................ 264/442
    See application file for complete search history.

(56) References Cited

U.S. PATENT DOCUMENTS

| | | | |
|---|---|---|---|
| 6,519,500 B1* | 2/2003 | White | G05B 19/00 |
| | | | 700/119 |
| 2014/0252668 A1 | 9/2014 | Austin et al. | |
| 2015/0064047 A1* | 3/2015 | Hyde | B22F 3/1055 |
| | | | 419/26 |
| 2016/0199158 A1* | 7/2016 | Heymann | A61C 13/0019 |
| | | | 264/16 |
| 2016/0200045 A1 | 7/2016 | Hopkins et al. | |
| 2017/0312981 A1 | 11/2017 | Selbertinger et al. | |
| 2017/0361534 A1 | 12/2017 | Fernandez-Nieves et al. | |
| 2018/0050495 A1 | 2/2018 | Stolyarov et al. | |

* cited by examiner

METHODS AND APPARATUS FOR 3D PRINTING OF HIGHLY VISCOUS MATERIALS

CROSS REFERENCE TO RELATED APPLICATIONS

This patent application is a 35 U.S.C. § 371 national phase application of PCT/US2017/060346, filed Nov. 7, 2017, which is related to and claims benefit of U.S. Provisional Patent Application Ser. No. 62/418,874 filed Nov. 8, 2016, which is incorporated herein by specific reference.

TECHNICAL FIELD

This disclosure generally relates to methods and apparatus for the 3D printing of highly viscous materials, especially to high amplitude ultrasonic vibration facilitated lower temperature 3D printing of highly viscous materials with a viscosity of at least 1000 Pa·s.

BACKGROUND

This section introduces aspects that may help facilitate a better understanding of the disclosure. Accordingly, these statements are to be read in this light and are not to be understood as admissions about what is or is not prior art.

Additive manufacturing methods have been increasingly receiving attention due to their numerous advantages over traditional methods like forming and machining. The most significant of these advantages is the ability to fabricate intricate, highly detailed parts on demand with little material waste. The immense industrial potential of these methods resulted in numerous alternative approaches and brought some of the initially highly specialized systems into commercial products that became ubiquitous. Nowadays, high quality plastic parts can be produced even at home with very little investment using a 3D printer system that employs fused deposition modeling (FDM) or digital light processing (DLP). It is highly desirable to expand the type of materials that can be printed. These materials include heterogeneous composites, such as clays that are precursors to ceramics, and also metals. Several of these materials have desirable structural and thermal properties compared to polymers.

Current 3D printing methods for additive manufacturing such as FDM, DLP, stereolithography (SL), selective laser melting (SLM), selective laser sintering (SLS) and ultrasonic consolidation (UC) are limited in their applicability. Specifically, heterogeneous composites and metal powders are very challenging to process with conventional approaches. FDM in its existing form can only work for polymers well above their melting/glass transition temperatures, due to their high viscosity, and for low melting temperature metals. In addition, the deposition rates are low, especially with small nozzle sizes, due to the viscosity of the materials. The use of low viscosity materials is problematic as well, because the printed parts do not retain their shapes until they are cured or solidified. SLM and SLS generally suffer from high porosity in the finished metal parts and low processing rates. SL and DLP are very fast and have good print resolutions, up to 30 μm, but are limited to UV curable polymers with low viscosity.

The printing of highly viscous materials is a challenge. The only available method known to the applicant uses very high pressure flow to push the material through the nozzle. Such systems are highly specialized and expensive and cannot be integrated with commercial systems. The 3D printing of clays and other viscous materials has been successfully performed using a pressurized reservoir with a nozzle. However, the required pressures are very high and the nozzle diameters are much bigger, on the order of many centimeters, to overcome the large reaction forces due to viscosity and wall friction and to get reasonable printing rates. The clays also require solvent additions up to 5% to decrease viscosity.

There are commercially available systems that use low amplitude ultrasonic vibrations to induce the flow of very low viscosity fluids through nozzles for inkjet printing. However, they cannot work for viscous fluids.

Some prior art disclosed the ultrasonic-assisted extrusion of metal materials. Such a method requires higher temperature, such as about 200° C., which is not suitable for many materials that are sensitive to high temperatures. See U.S. Pat. No. 9,156,072 B2.

New approaches for enhancing print quality and rates, while being applicable to different material systems, especially to highly viscous and high temperature sensitive material systems, are therefore of critical industrial need. Thus there exists an unmet need for methods and apparatus for the 3D printing of materials, especially highly viscous materials with less cost and at print resolutions of 100 μm or less.

SUMMARY

The present disclosure provides novel methods and apparatus for the 3D printing of highly viscous materials, especially to a high amplitude ultrasonic vibration facilitated lower temperature 3D printing method and apparatus for highly viscous materials with a viscosity of at least 1000 Pa·s.

In one embodiment, the present disclosure provides a three-dimensional (3D) printing method for highly viscous materials comprising:
a) providing a 3D printer comprising a reservoir, a nozzle, and a high amplitude ultrasonic vibration generator, wherein the high amplitude ultrasonic vibration generator is configured to generate an ultrasonic vibration through a vibration probe with an amplitude of 1-200 μm near the nozzle; and the nozzle is positioned at or in the close vicinity of a node of the ultrasonic vibration;
b) providing a highly viscous material substantially free of any thinning material, wherein the highly viscous material has a viscosity of at least 1000 Pa·s and/or a solid content of at least 60%; and
c) 3D printing the highly viscous material at a temperature lower than 100° C. to provide a 3D printed material with a porosity of less than 10%.

In one embodiment, the present disclosure provides a 3D printing system comprising a reservoir, a nozzle, a high amplitude ultrasonic vibration generator, wherein the high amplitude ultrasonic vibration generator is configured to generate an ultrasonic vibration through a vibration probe with an amplitude of 1-200 μm near the nozzle, and the nozzle is positioned at or in the close vicinity of a node of the ultrasonic vibration.

BRIEF DESCRIPTION OF DRAWINGS

Some of the figures shown herein may include dimensions. Further, some of the figures shown herein may have been created from scaled drawings or from photographs that are scalable. It is understood that such dimensions or the relative scaling within a figure are by way of example, and not to be construed as limiting. Objects and features of this disclosure will be better understood from the following description taken in conjunction with the drawing, wherein.

DETAILED DESCRIPTION

Figure 1:
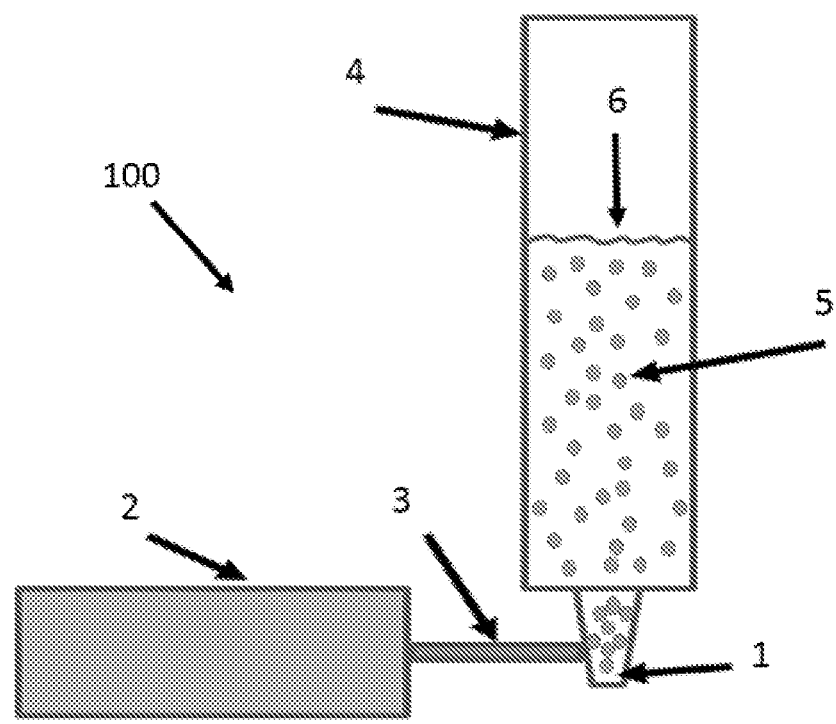
FIG. 1 is a schematic representation of the operation principle of the 3D printer of this disclosure in the case of a heterogeneous viscous material such as clay.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, such alterations and further modifications in the illustrated device, and such further applications of the principles of the disclosure as illustrated therein being contemplated as would normally occur to one skilled in the art to which the disclosure relates.

In the present disclosure the term "about" can allow for a degree of variability in a value or range, for example, within 10%, within 5%, or within 1% of a stated value or of a stated limit of a range.

In the present disclosure the term "substantially" can allow for a degree of variability in a value or range, for example, within 90%, within 95%, or within 99% of a stated value or of a stated limit of a range.

In the present disclosure, the term "close vicinity of a node of ultrasonic vibration" may refer to a position or a reasonable range of position that is sufficiently close to the node of the ultrasonic vibration to ensure the printing quality, especially the resolution of the 3D printed product to be no more than 100 µm under a temperature lower than 100° C.

In this disclosure, methods and apparatus for 3D printing of highly viscous materials are disclosed. This disclosure describes a novel method for the 3D printing of highly viscous materials (µ>1000 Pa·s) by the application of high-amplitude vibrations at the nozzle connected to a reservoir filled with the material of interest as the controlling mechanism, which can lower the effective viscosity allowing an applied pressure differential, i.e. compressed gas, feed screw, etc. to feed material out for the desired increment. The reservoir can be separated from or part of the system utilized to impart vibrations to the nozzle. The rest of the system is similar to an FDM printer or other similar systems, where the nozzle is moved in 3D to print out the material in an additive fashion. The method can be described as vibratory printing (VP) and an apparatus that accomplishes VP as vibratory-printing apparatus. Vibratory printing (VP) utilizes the unique effects of high-amplitude (such as 1-200 µm) ultrasonic vibrations that can reduce apparent friction and effective flow stress of highly viscous materials such as clays that are precursors for ceramics, composite propellants or explosives, viscous food slurries, and numerous others. For purposes of this disclosure, materials with a viscosity higher than 1000 Pa·s are considered highly viscous.

Figure 2:
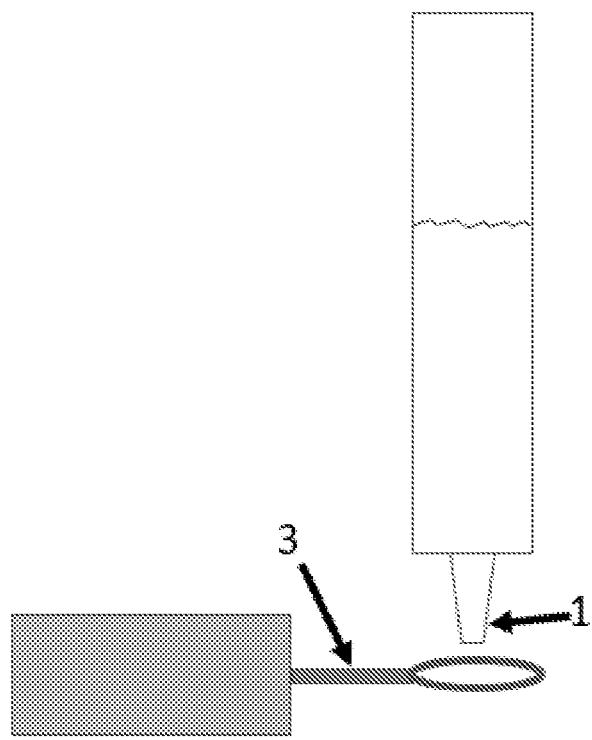
FIG. 2 is a partial view of an apparatus suitable for vibratory printing according to the present disclosure with a ring-shaped configuration for an ultrasonic probe or actuator (3).

FIG. 1 is a schematic illustration of the operating principle of the VP apparatus of this disclosure which can be used for the VP method of this disclosure to effectively print high viscosity materials such as, but not limited to, clay. Referring to FIG. 1, system (100) comprises a nozzle (1), a high amplitude vibration generator (2), an ultrasonic probe or actuator (3), and a reservoir (4) for highly viscous materials (5). During the 3D printing, a pressure (6) is applied to the highly viscous materials (5). Materials in the reservoir other than the highly viscous materials, such as a fluid medium in which the particles are suspended are not shown in FIG. 1. High amplitude vibrations are applied in a way that the nozzle (1) is positioned at or in the close vicinity of a node of the high amplitude vibration, while a sufficient pressure (6) is applied to the material to maintain a pressure differential across the printing end of the nozzle and the other wider end. A non-limiting range for the amplitude of these vibrations may be 1-200 µm. These vibrations can be applied to the nozzle by means of an ultrasonic probe or actuator (3). The ultrasonic probe or actuator (3) may have any configuration at the end that is used to pass the vibration to the nozzle (1). As shown in FIG. 2, a ring-shaped configuration that can be applied to surround the nozzle may provide advantage since it provides more evenly distributed vibration to the nozzle (1) when the nozzle is positioned within the ring. There can be one or more ultrasonic probes or actuators (3) as far as the nozzle (1) is positioned at or in the close vicinity of a node of the ultrasonic vibration generated by one or more ultrasonic probe or actuator (3). Ensuring that the nozzle (1) is positioned at or in the close vicinity of a node of the ultrasonic vibration may provide unexpected advantages. For example, there is a much lower temperature need to achieve the successful low porosity 3D printing. Prior art disclosures normally require a much higher temperature to make the to-be-printed material a molten material. For certain high-temperature sensitive materials, the present disclosure provides a much safer method of material deposition. In the present invention, the extruded materials are not molten since they are far below their melting temperatures. In some instances, the ultrasonic probe itself can be the nozzle (1). These vibrations reduce the viscosity of the printing material by decreasing its flow stress. Further these vibrations reduce the inter particle friction as well as the friction between the walls of the nozzle and the particles in the printing material. Also, in the methods and apparatus of the present disclosure, the ultrasonic vibrations are used to induce flow and also as the on-off trigger for material deposition.

The application of the vibration enables the use of fine nozzles with diameters less than 100 µm, in addition to larger nozzles, with very high feed rates for the rapid printing of a wide variety of materials with high resolution (100 µm or less). The higher resolutions, apart from the obvious advantage of higher quality parts, can also reduce the porosity. The required pressure differential for pushing the feed stock or the thick fluid is reasonable when such vibrations are employed. For example, here a pressure of 25 psi was sufficient. In the absence of vibrations, even at 100 psi (the maximum pressure that could be applied in the current setup), the flow rates were less. Furthermore, the less viscous fluid in the heterogeneous mixture tends to get preferentially squeezed out between the particles and extrude, eventually clogging the nozzle with the solids left behind. There was also no control of flow. For reducing the friction, the use of ultrasonic frequencies is much more effective and high amplitudes such as those in the non-limiting range of 1-200 µm are also required, as submicron amplitudes appear to have negligible effect. The field of high-intensity ultrasonic vibration is not broadly studied, and the transducers and electronics required are highly specialized. High amplitude vibrations at ultrasonic frequencies are fundamentally different from those that are low amplitude lower frequency due to unique contribution of inertial effects in these regimes.

Vibratory printing, as disclosed herein, can be extremely significant and useful in light of current additive manufacturing methods, because the presently disclosed approach can be readily integrated into existing systems. The relative simplicity of the process and the equipment and the small cost associated keeps the initial and operating costs to a minimum compared to other methods that require expensive equipment and material specific consumables. VP can create new potential opportunities for industrial applications, such as the large scale metal printing of near-net shape parts, which are not feasible and cost-effective using the existing methods.

High amplitude ultrasonic vibrations can reduce apparent friction between surfaces, due to the vibration amplitudes being comparable to asperity dimensions.

The system can be easily integrated into existing commercial printing systems, by nozzle or reservoir modification. Importantly, the flow of the material is controlled very precisely by turning on/off the ultrasonic vibrations for tight tolerances on printed parts. This is not possible with just the application of pressure, as the material continues to flow when the pressure is reduced or shut off. The possibility of printing ceramics enables the near-net shape printing of biomedical parts such as porcelain teeth and implants. Another possible application is the printing of metals with low porosity. Methods that use nozzles utilize a mixture of metal powder with a polymer which is melted and extruded. However, high viscosities limit the solid fraction that can be attained. Such prints need to be treated at elevated temperatures to drive off the polymer and provide adhesion between metal particles, but the dimensions of the prints vary considerably due to the low volume fraction of the metal powder. VP can use high viscosity mixtures of metals and plasticizers with >60 vol % solids and thus the prints do not change shape after elevated temperature treatments, because the individual metal particles are already in intimate contact.

As described above, the vibratory printing detailed in this disclosure uses a modified nozzle for 3D printing systems, which applies high amplitude vibrations to the printed material to reduce the flow stress and friction. This enables the printing of highly viscous materials through fine nozzles with diameters down to at least a few hundred micrometers at high flow rates. The technology also enables the on-off control of the flow to deposit precise amounts of materials such as thick pastes that consist of mixtures and ceramics that are highly viscous. The combination of high flow rate with fine nozzle dimensions enables previously prohibitive high resolution printing with reasonable printing durations.

The general term vibration generator can be used for the vibration-generating element of the VP printing apparatus. Thus an ultrasonic probe or an ultrasonic actuator fall into the general class of vibration generators. It should be noted that the VP printing apparatus of FIG. 1 can be further modified to integrate the vibration probe or actuator, which one can generally term as vibration generator, into the reservoir-nozzle system. This is accomplished by an arrangement, wherein the vibration generator is mechanically coupled to the reservoir.

It should be noted that the methods and apparatus of the present disclosure provide the ability to print highly viscous materials through reduced flow stress and friction. They also enable very high resolution printing at very high speeds due to the increased flow rate that enables the use of fine nozzles. The presently disclosed method and apparatus also provide precise on/off digital control of the flow that provides better printing control with high resolution.

It should be further recognized that the methods and apparatus of this disclosure also enable on-off control of the flow to deposit precise amounts of materials such as thick pastes that consist of mixtures, ceramics and semi-solid metals that are highly viscous. The combination of high flow rate with fine nozzle dimensions enables previously prohibitive high resolution printing with reasonable printing durations.

The methods and apparatus of this disclosure are also applicable to novel material systems that were not successfully printed before. Metals and ceramics with high resolution can be printed using these methods and apparatuses. The method can also be easily integrated into existing 3D printing systems.

Because most 3D printed parts are built layer-by-layer, a previous layer to build upon is required. Depending on the specific 3D printing technology and the complexity of the 3D model, this can mean that a 3D print requires support structures. The present disclosure, however, provides a method that can print highly viscous materials with no support or minimal support while still maintain the excellent printing quality due to the high yield strength of such materials.

Materials and Methods

A commercial 3D printer (Monoprice Mini) was modified by replacing the print head with a pneumatically operated low-density polyethylene syringe with a nozzle opening of 600 µm rated up to 0.69 MPa (Mcmaster Carr Semi-Clear Syringe 66305A55). The syringe was attached to a custom ultrasonic mini probe with a threaded hole at the end, which was driven by a function generator (Fluke 294 Waveform Generator) and an amplifier connected to a transformer (turn ratio 1:20) to switch on the high-amplitude vibrations for flow control of the material. The peak-to-peak voltage applied to the transducer was up to 500 V at a frequency of 30.3 kHz which produced nozzle displacements of 16 µm in this configuration. The source waveform was switched on and off using a relay attached to the filament feed stepper motor output, which was controlled by turning the stepper motor on and off in the printer GCode. Duty cycles were used for controlling temperature rises. The ultrasonic vibrations were turned on 1 second and turned off 1 second (or within a range from 500 ms to 2 s in general). When they were turned off, the print waited for that amount. This prevented excessive heating. The syringe was pressurized using a commercial air compressor (Fini Advanced 2 gallon 125 psi air compressor). The materials investigated were a commercial polymer clay (Sculpey Oven Bake), natural clay (AMACO Air Dry Natural Clay), a stiffened fondant mix (66 wt. % Wilton Decorator Preferred Fondant, 26 wt. % C&H powdered sugar, 8 wt. % Clover Valley Light Corn Syrup), and a propellant (85 wt. % of ammonium perchlorate particles in the size range 60-130 µm, 15% of hydroxyl terminated polybutadiene (HTPB) as a polymer binder). The viscosity and yield strength of the materials were measured with a capillary rheometer (Bohlin Rosand RH2000) at shear rates in the range of 2-50 $s^{-1}$ with two capillaries with diameters of 4 mm and lengths of 16 mm and 32 mm to apply Bagley correction. The flow rate of the material in the printing syringe was measured with a high-speed camera (Vision Research Phantom V 7.3) at varying pressures. The temperatures of the nozzle and materials during printing were measured using a FLIR A325 infrared camera at 30 Hz. A fan and a lower duty cycle for the vibrations were used to keep the temperature rise below 30° C.

| Example No. | Materials | Viscosity (Pa·s) | T (° C.) | P (MPa) | Vibration amplitude (μm) | Porosity | Printing speed (mm/s) | Nozzle size (μm) |
|---|---|---|---|---|---|---|---|---|
| 1 | polymer clay | about 9,000 | 50 | 0.48 | 16 | <5% | 5 | 600 |
| 2 | stiffened fondant mix | about 14,000 | 30 | 0.15 | 16 | <5% | 5 | 600 |
| 3 | propellant | about 10,000 | 30 | 0.15 | 16 | <5% | 5 | 600 |

Figure 3:
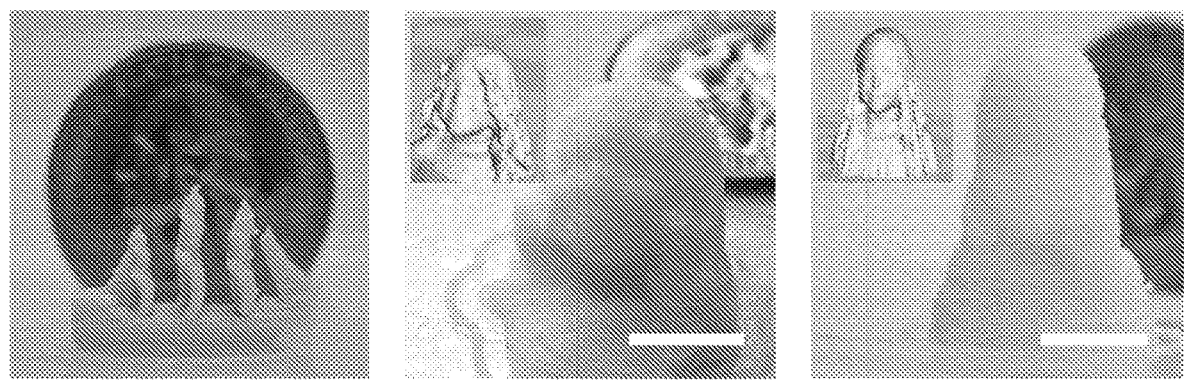
FIG. 3 provides some 3D printed samples. a) Polymer clay 20 mm long pirate ship printed with no supports (nozzle size 600 µm, layer height of 250 µm, print speed 5 mm/s, back pressure 0.69 MPa, print temperature 50° C.). b, c) 3D models (base width is 20 mm) and their 3D printed forms using a fondant mix (nozzle size 600 µm, layer height of 250 µm, print speed 5 mm/s, back pressure 0.15 MPa, print temperature 30° C.). The scale bars are 10 mm.

FIG. 3 provides some 3D printed products with highly viscous materials.

In one embodiment, the present disclosure provides a three-dimensional (3D) printing method for highly viscous materials, wherein the method comprises:
  a) providing a 3D printer comprising a reservoir, a nozzle, and a high amplitude ultrasonic vibration generator, wherein the high amplitude ultrasonic vibration generator is configured to generate an ultrasonic vibration through a vibration probe with an amplitude of 1-200 μm near the nozzle; and the nozzle is positioned at or in the close vicinity of a node of the ultrasonic vibration;
  b) providing a highly viscous material substantially free of any thinning material, wherein the highly viscous material has a viscosity of at least 1000 Pa·s and/or a solid content of at least 60%; and
  c) 3D printing the highly viscous material at a temperature lower than 100° C. to provide a 3D printed material with a porosity of less than 10%.

In one embodiment, the present disclosure provides a three-dimensional (3D) printing method for highly viscous materials, wherein the method comprises:
  a) providing a 3D printer comprising a reservoir, a nozzle, and a high amplitude ultrasonic vibration generator, wherein the high amplitude ultrasonic vibration generator is configured to generate an ultrasonic vibration through a vibration probe with an amplitude of 1-200 μm near the tip of the nozzle; and the tip of the nozzle is positioned at or in the close vicinity of a node of the ultrasonic vibration;
  b) providing a highly viscous material substantially free of any thinning material, wherein the highly viscous material has a viscosity of at least 1000 Pa·s and/or a solid content of at least 60%; and
  c) 3D printing the highly viscous material at a temperature lower than 100° C. to provide a 3D printed material with a porosity of less than 10%.

In one embodiment of the present disclosure, the 3D printing temperature is lower than 75° C. at the nozzle. In one aspect, the 3D printing temperature is lower than 50° C. In one aspect, the 3D printing temperature is lower than 30° C. In one aspect, the 3D printing temperature is between 0-100° C., 0-50° C., or 0-30° C.

In one embodiment of the present disclosure, the 3D printed materials have a porosity of less than 20%, 15%, 10%, 5%, 4%, 3%, 2%, or 1%. In one aspect, the 3D printed materials have a porosity of about 0-20%, 0-15%, 0-5%, 0-4%, 0-3%, 0-2%, or 0-1%.

In one embodiment of the present disclosure, the 3D printing is carried out by applying a pressure under 30, 25, 20, 15, 10, 5, 4, 3, 2, 1, 0.9, 0.8, 0.7, 0.6, 0.5, 0.4, 0.3, 0.2, or 0.1 MPa.

In one embodiment of the present disclosure, the 3D printed material has a 3D printing resolution of 100 μm or less, 90 μm or less, 80 μm or less, 70 μm or less, 60 μm or less, 50 μm or less, 40 μm or less, 20 μm or less. In one aspect, the 3D printing resolution is about 20-100 μm, 40-100 μm, 50-100 μm, 60-100 μm, 70-100 μm, 80-100 μm, or 90-100 μm.

In one embodiment of the present disclosure, the amplitude of the ultrasonic vibration is about 0.5-200 μm, 1-200 μm, 5-200 μm, 0.5-100 μm, 1-100 μm, 5-100 μm, 0.5-75 μm, 1-75 μm, or 5-75 μm.

In one embodiment of the present disclosure, the frequency of the ultrasonic vibration is about 10-200 kHz, 10-150 kHz, 10-100 kHz, 10-75 kHz, 10-50 kHz, 20-200 kHz, 20-150 kHz, 20-100 kHz, 20-75 kHz, or 20-50 kHz.

In one embodiment of the present disclosure, the diameter of the nozzle is about 5-1000 μm, 5-500 μm, 5-100 μm, 10-1000 μm, 10-500 μm, 10-100 μm, 20-1000 μm, 20-500 μm, 20-100 μm.

In one embodiment, the present disclosure provides a 3D printing method to print a highly viscous material with minimum or no support.

In one embodiment, the present disclosure provides a 3D printing method wherein the vibration probe has a ring-shaped configuration to keep the nozzle run through and within the ring-shaped configuration to provide evenly distributed vibration.

In one embodiment, the present disclosure provides a 3D printing system comprising a reservoir, a nozzle, a high amplitude ultrasonic vibration generator, wherein the high amplitude ultrasonic vibration generator is configured to generate an ultrasonic vibration through a vibration probe with an amplitude of 1-200 μm near the nozzle, the nozzle is positioned at or in the close vicinity of a node of the ultrasonic vibration. In one aspect, the high amplitude ultrasonic vibration generator is configured to generate an ultrasonic vibration through a vibration probe with an amplitude of 1-200 μm near the tip of the nozzle, the tip of the nozzle is positioned at or in the close vicinity of a node of the ultrasonic vibration.

In one embodiment, the vibration probe has a ring-shaped configuration to keep the nozzle run through and within the ring-shaped configuration to provide evenly distributed vibration.

While the present disclosure has been described with reference to certain embodiments, it will be apparent to those of ordinary skill in the art that other embodiments and implementations are possible that are within the scope of the present disclosure without departing from the spirit and scope of the present disclosure. Accordingly, it should be understood that the disclosure is not limited to any embodiment described herein. It should also be understood that the phraseology and terminology employed above are for the purpose of describing the disclosed embodiments, and do not necessarily serve as limitations to the scope of the disclosure.

We claim:

1. A three-dimensional (3D) printing method for highly viscous materials, wherein the method comprises:
   a) providing a 3D printer comprising a reservoir, a nozzle, and a high amplitude ultrasonic vibration generator, wherein the high amplitude ultrasonic vibration generator is configured to generate an ultrasonic vibration through a vibration probe with an amplitude of 1-200 µm near the nozzle; and the nozzle is positioned at or in the close vicinity of a node of the ultrasonic vibration, wherein said vibration probe is not in physical contact with said reservoir and said nozzle;
   b) providing a highly viscous material substantially free of any thinning material, wherein the highly viscous material has a viscosity of at least 1000 Pa·s and/or a solid content of at least 60%; and
   c) 3D printing the highly viscous material at a temperature lower than 100° C. at the nozzle tip to provide a 3D printed material with a porosity of less than 10%.

2. The method of claim 1, wherein the high amplitude ultrasonic vibration generator is configured to generate an ultrasonic vibration through a vibration probe with an amplitude of 1-200 µm near the tip of the nozzle; and the tip of the nozzle is positioned at or in the close vicinity of a node of the ultrasonic vibration.

3. The method of claim 1, wherein the 3D printing temperature is lower than 50° C.

4. The method of claim 1, wherein the 3D printed material has a porosity of less than 5%.

5. The method of claim 4, wherein the 3D printed material has a porosity of less than 2%.

6. The method of claim 1, wherein the 3D printing is carried out by applying a pressure under 1 MPa.

7. The method of claim 1, wherein the 3D printed material has a 3D printing resolution of 100 µm or less.

8. The method of claim 1, wherein the 3D printing is carried out with minimum or no support.

9. The method of claim 1, wherein the vibration probe has a ring-shaped configuration to keep the nozzle run through and within the ring-shaped configuration to provide evenly distributed vibration.

* * * * *